United States Patent
Duong et al.

(10) Patent No.: US 7,950,151 B2
(45) Date of Patent: May 31, 2011

(54) METHOD OF MAKING INTEGRAL SUN GEAR COUPLING

(75) Inventors: Loc Duong, San Diego, CA (US); Michael E. McCune, Colchester, CT (US); Louis J. Dobek, Jr., Somers, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 12/536,650

(22) Filed: Aug. 6, 2009

(65) Prior Publication Data

US 2009/0293278 A1    Dec. 3, 2009

Related U.S. Application Data

(62) Division of application No. 11/391,764, filed on Mar. 22, 2006, now Pat. No. 7,591,754.

(51) Int. Cl.
    *B23P 11/00*      (2006.01)
    *B23P 15/14*      (2006.01)
    *F16H 57/08*      (2006.01)

(52) U.S. Cl. ...... 29/893.1; 29/525.14; 29/557; 475/347; 475/346; 464/79

(58) Field of Classification Search ............. 29/893.1, 29/557, 525.14; 475/331, 346, 347; 464/79, 464/80
See application file for complete search history.

(56) References Cited

U.S. PATENT DOCUMENTS

| | | | |
|---|---|---|---|
| 3,754,484 A | | 8/1973 | Roberts |
| 4,177,692 A | * | 12/1979 | Irwin ............................ 464/180 |
| 5,233,247 A | | 8/1993 | Stark |
| 5,433,674 A | | 7/1995 | Sheridan et al. |
| 6,210,283 B1 | * | 4/2001 | Wojciechowski et al. ..... 464/181 |
| 6,223,616 B1 | | 5/2001 | Sheridan |
| 6,855,089 B2 | | 2/2005 | Poulin et al. |
| 6,910,987 B2 | * | 6/2005 | Richards ........................ 475/283 |
| 7,591,754 B2 | * | 9/2009 | Duong et al. ................. 475/347 |
| 2005/0059523 A1 | | 3/2005 | Hasegawa et al. |
| 2006/0079335 A1 | | 4/2006 | Muskus et al. |

FOREIGN PATENT DOCUMENTS

| | | |
|---|---|---|
| DE | 4445413 A1 | 12/1994 |
| EP | 0211090 A1 | 2/1987 |
| EP | 0459352 A1 | 5/1991 |

OTHER PUBLICATIONS

European Search Report, dated Apr. 22, 2010, for 07251132.2-1252/1837542.

* cited by examiner

*Primary Examiner* — Sarang Afzali
(74) *Attorney, Agent, or Firm* — Kinney & Lange, P.A.

(57) ABSTRACT

A method of constructing an integral coupling system containing a sun gear is disclosed. An integral sun gear is provided that has a sun gear component and a connection shaft. A first straight flat inner edge is machined on a first diaphragm to use as a datum point, and then the straight flat edge is fixtured. A tapered outer edge is machined on the first diaphragm, and the first diaphragm is welded to the integral sun gear. The flat inner edge is generally perpendicular to a central axis of the connection shaft.

10 Claims, 3 Drawing Sheets

METHOD OF MAKING INTEGRAL SUN GEAR COUPLING

CROSS-REFERENCE TO RELATED APPLICATIONS

This application is a divisional application of U.S. patent application Ser. No. 11/391,764 by Loc Duong, Michael E. McCune, and Louis J. Dobek, entitled "EPICYCLIC GEAR TRAIN INTEGRAL SUN GEAR COUPLING DESIGN," filed on Mar. 22, 2006, now U.S. Pat. No. 7,591,754, which is herby incorporated by reference. Further, U.S. patent application Ser. No. 12/536,642 by Loc Duong, Michael E. McCune, and Louis J. Dobek, entitled "INTEGRAL SUN GEAR COUPLING," filed on even date with this application, now U.S. Pat. 7,780,568, is a divisional application of U.S. patent application Ser. No. 11/391,764 by Loc Duong, Michael E. McCune, and Louis J. Dobek, entitled "EPICYCLIC GEAR TRAIN INTEGRAL SUN GEAR COUPLING DESIGN," filed on Mar. 22, 2006.

BACKGROUND

This invention relates to planetary gear trains. More particularly, the invention relates to a coupling system for flexibly connecting a sun gear to a rotating shaft so that the reliability and durability of the gear system components are improved. The invention is useful in aircraft engines where reliability, durability and simplicity are highly desirable.

Planetary gear trains are mechanical structures for reducing or increasing the rotational speed between two rotating shafts. The compactness of planetary gear trains makes them appealing for use in aircraft engines where space is at a premium.

The forces and torque transferred through a planetary gear train place tremendous stresses on the gear train components, making them susceptible to breakage and wear, even under ideal conditions. In practice, conditions are often less than ideal and place additional stresses on the gear components. For example, the longitudinal axes of a sun gear, a planet carrier, and a ring gear are ideally coaxial with the longitudinal axis of an external shaft that rotates the sun gear. Perfect or ideal coaxial alignment, however, is rare due to numerous factors including imbalances in rotating hardware, manufacturing imperfections, and transient flexure of shafts and support frames due to aircraft maneuvers. The resulting parallel and angular misalignments impose moments and forces on the gear teeth, the bearings which support the planet gears in their carrier, and the carrier itself. The imposed forces and moments accelerate gear component wear and increase the likelihood of component failure in service. Thus, accelerated component wear necessitates frequent inspections and part replacements which can render the engine and aircraft uneconomical to operate.

The risk of component breakage can be reduced by making the gear train components larger and therefore stronger. Increased size may also reduce wear by distributing the transmitted forces over correspondingly larger surfaces. However, increased size offsets the compactness that makes planetary gear trains appealing for use in aircraft engines, and the corresponding weight increase is similarly undesirable. The use of high strength materials and wear resistant coatings can also be beneficial, but escalates the cost of the gear train and therefore reduces its desirability.

Stresses due to misalignments can also be reduced by the use of flexible couplings to connect the gear train to external devices such as rotating shafts or nonrotating supports. For example, a flexible coupling connecting a sun gear to a drive shaft flexes so that the sun gear remains near its ideal orientation with respect to the mating planet gears, even though the axis of the shaft is oblique or displaced with respect to a perfectly aligned orientation. Many prior art couplings, however, contain multiple parts which require lubrication and are themselves susceptible to wear. Prior art couplings may also lack adequate rigidity and strength, with respect to torsion about a longitudinal axis, to be useful in high torque applications. Misalignment can also be accommodated by a splined connection. However the motion that occurs between the contacting spline teeth in a splined connection creates friction which is highly variable and causes the flexibility of such a connection to also be variable.

In view of these shortcomings, a simple, reliable, coupling system for connecting components of a planetary gear train to external devices while accommodating misalignment there between is sought.

SUMMARY

A method of constructing an integral coupling system containing a sun gear is disclosed. An integral sun gear is provided that has a sun gear component and a connection shaft. A first straight flat inner edge is machined on a first diaphragm to use as a datum point, and then the straight flat edge is fixtured. A tapered outer edge is machined on the first diaphragm, and the first diaphragm is welded to the integral sun gear. The flat inner edge is generally perpendicular to a central axis of the connection shaft.

DETAILED DESCRIPTION

Figure 1:
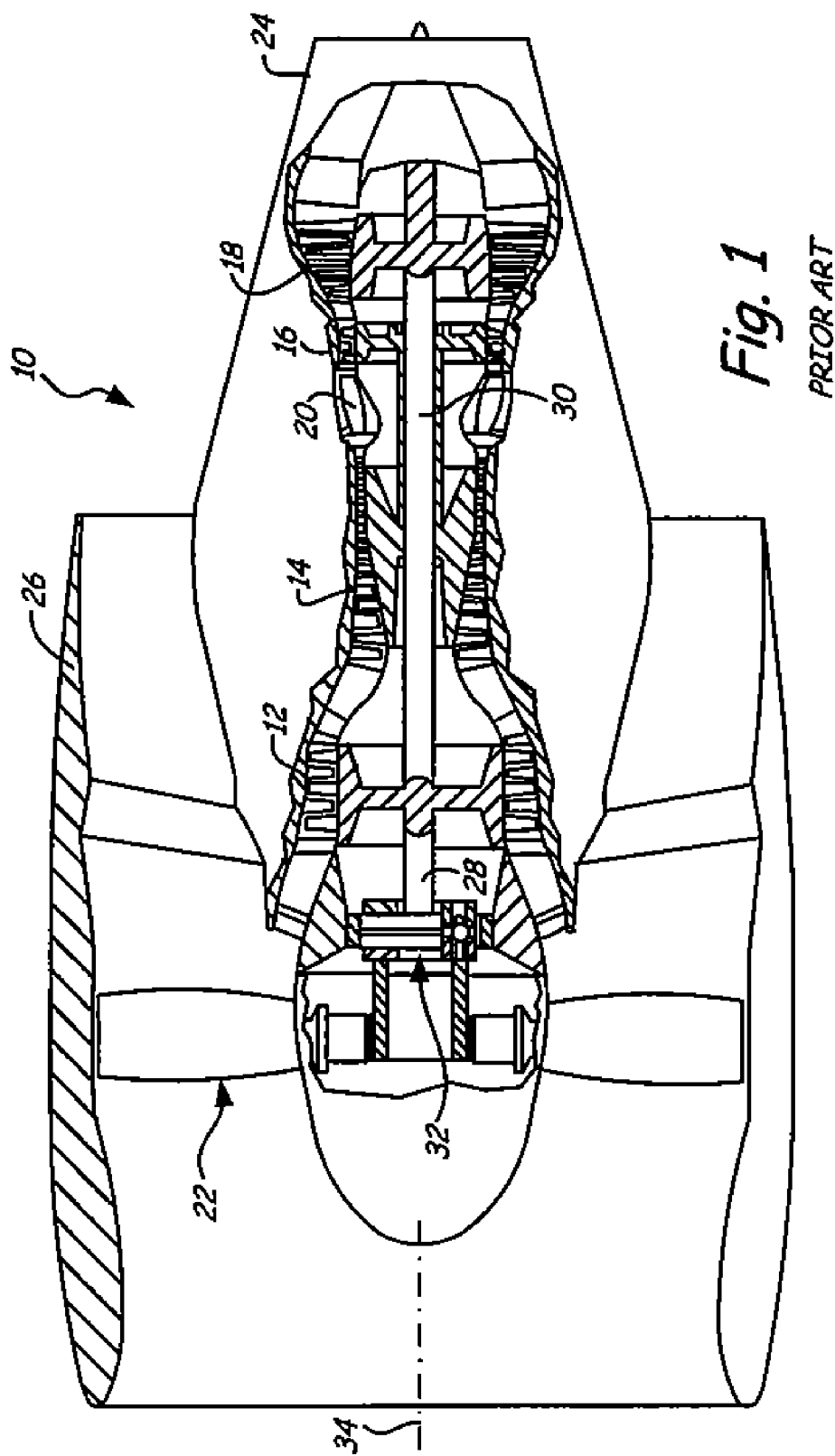
FIG. 1 is a schematic cross-sectional side elevation view of a turbine engine containing a planetary gear train.

FIG. 1 shows a typical turbine engine 10 known in the art, which includes as its principal components one or more compressors 12, 14, one or more turbines 16, 18 for powering compressors 12, 14, combustion chamber 20, fan 22, primary exhaust 24 and fan exhaust nozzle 26. A power train such as shafts 28, 30 extends from each turbine 16, 18 to drive the corresponding compressor 12, 14. The rotary motion of one of compressors 12, 14 is conveyed to fan 22 by way of planetary gear train 32. Planetary gear train 32 reduces the rotational speed of a compressor to a speed more suitable for the efficient operation of fan 22. The principal engine components are ideally concentric with central longitudinal axis 34.

Figure 2:
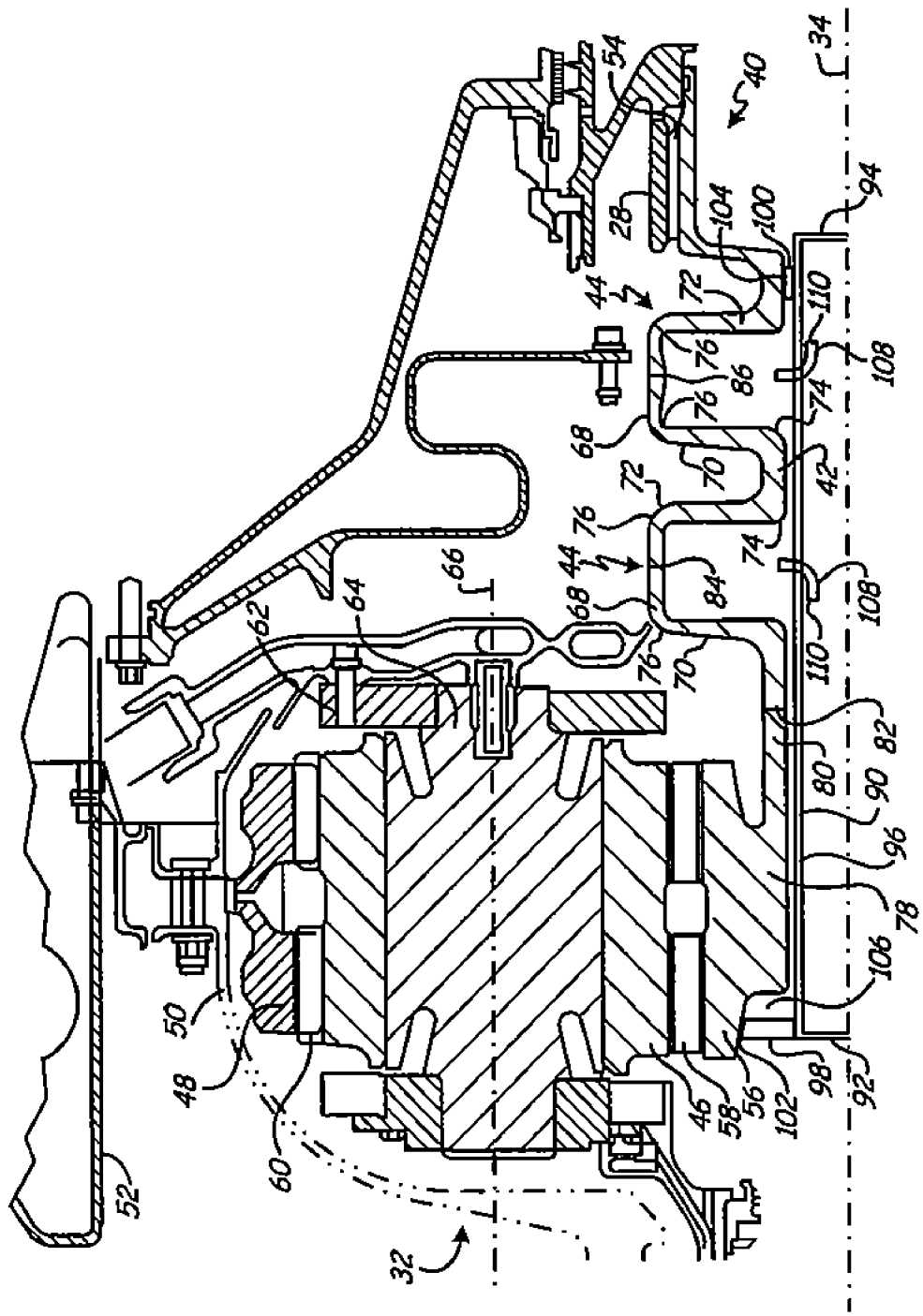
FIG. 2 is a cross-sectional elevation view of a coupling system for the planetary gear system of the present invention.

FIG. 2 is a cross-sectional elevation view of an integral coupling system 40 for planetary gear system 32 of FIG. 1, and its relationship to engine 10. Integral coupling system 40 comprises inflexible spindle 42 and at least one undulant flexible section 44 which rotate about central longitudinal axis 34.

Also illustrated are compressor drive shaft 28, planet gear 46, ring gear 48, ring gear housing 50, ring gear coupling 52, and integral sun gear 56. The forward end of compressor drive shaft 28 is joined by splines 54 to the aft end of integral coupling system 40. Integral sun gear 56 engages planet gear 46 through mesh 58. Rotary motion of drive shaft 28 is thus transferred to sun gear 56, which meshes with multiple planet gears 46. Each planet gear 46 is rotatably mounted in planet carrier 62 by journal pin 64 or other suitable bearing so that the rotary motion of integral sun gear 56 urges each planet gear 46 to rotate about longitudinal axis 66. Each planet gear 46 also meshes with ring gear 48 through mesh 60. The ring gear 48 is mounted in ring gear housing 52.

In one embodiment, ring gear coupling 52 joins ring gear housing 50 to a mechanical ground to prevent rotating of the ring gear. Since planet gears 46 mesh with both a nonrotating ring gear 48 and rotating integral sun gear 56, planet gears 46 not only rotate about axes 66 but also orbit integral sun gear 56 causing planet carrier 62 to rotate about axis 34. This is commonly referred to as a planetary gear system. Planet carrier 62 motion is conveyed to fan 22 (of FIG. 1) by any suitable means, not illustrated.

In an alternate embodiment, the ring gear 48 is allowed to rotate, while the planet gears 46 remain is a set position and only rotate about their respective individual central axes. The rotating of the integral sun gear 56 about the planet gears 46 results in rotary motion of the ring gear 48. The motion of the ring gear is conveyed to fan 22 (of FIG. 1) by any suitable means not illustrated. This configuration is referred to a star gear system. Sun gear coupling 40 of the current invention may be present in either the star gear system or the planetary gear system.

Sun gear coupling 40 comprises inflexible spindle 42 and at least one undulant flexible section 44. Flexible section 44 includes cylindrical ring 68, which has a diameter greater than that of spindle 42, and is joined to spindle 42 by longitudinally spaced diaphragms 70 and 72. Junctures 74 between diaphragms 70, 72 and spindle 42, as well as junctures 76 between diaphragms 70, 72 and ring 68, have a curved cross sectional profile to improve the flexibility of coupling 42 and minimize stress concentrations at junctures 74, 76. A single flexible section 44 is adequate for accommodating angular misalignment between integral sun gear 56 and shaft 28.

Two or more longitudinally spaced apart flexible sections 44 are used for accommodation of parallel misalignment or a combination of angular and parallel misalignment. Splines 54 at the end of coupling 40 does not contribute materially to the flexibility of integral coupling 40; rather integral coupling 40 derives its flexibility primarily from undulant sections 44. The torsional rigidity of ring 68 and spindle 42 make coupling 40 rigid with respect to torsion about longitudinal axis 34. In addition, the undulant character of flexible section 44 makes coupling 40 compliant with respect to torsion about vertical and lateral axes (i.e. with respect to angular misalignments in a horizontal plane and in a vertical plane parallel to axis 34) and with respect to translation about all three axes. Accordingly, integral coupling 40 transmits high torque while isolating gear train 32 from forces and moments arising from misalignments between integral sun gear 56 and external shaft 28.

Integral coupling system 40 includes integral sun gear 56 comprising sun gear component 78 and connection shaft 80. Integral sun gear 56 is fabricated as single piece from steel or other appropriate material known to those of skill in the art. Connection shaft 80 will rotate about central longitudinal axis 34 as the integral sun gear 56 rotates and act as part of spindle 42. Integral sun gear 56 is connected to flexible sections 44 to create a unitary integral coupling system 40 such as by welds 82, 84, and 86. Although illustrated as three relatively short length sections, spindle 42 comprises various sized sections which allow joining the integral sun gear 56 to the drive shaft 28 between the respective sun gear 56, flexible sections 44, and shaft 28, all of which are made from steel, or similar material. Integral sun gear 56 eliminates the manufacturing of separate parts of a splined gear and corresponding splined coupling shaft present in the prior art, thus reducing the complexity and cost of the system. A reduction in maintenance cost is also achieved as the reliability of the gear train is increased due to the prevention of spline wear and a reduced risk of gear train component breakage resulting from the misalignment thereof. The unitary construction reduces the previous five piece multipart design to one piece. The continuous nature of integral coupling system 40 provides greater flexibility than could be obtained with bolted flanges at the rings 68 or similar structures in an equivalent radial space.

Integral gear coupling 40 may include a flexible tubular insert 90 having inlet 92 and outlet 94 which acts as a conduit to deliver oil for lubrication of the system. Oil, not shown, is supplied to inlet 92 and is centrifuged radially outward by the rotation of integral coupling 40 and insert 90, so that the oil forms a film on the inner surface 96 of insert 90. Forward and aft standoffs 98 and 100 each form a ring around the circumference of insert 90 to support it radially within integral coupling 40. Insert 90 is retained longitudinally in place by a snap ring (not illustrated) or other suitable means for securing insert 90 with respect to coupling 40. Surfaces 102 and 104 of standoffs 98 and 100, respectively, are spherical to promote rolling motion along inner wall 106 of integral coupling 40 and not resist the flexure thereof. Each spherical surface also contains groove within which seal rings are disposed to prevent oil leakage into undulant sections 44 (not illustrated).

A group of elbows 108 associated with each undulant flexible section 44 extends through the wall of insert 90 so that the interior of each undulant section 44 can be readily inspected with a flexible optical instrument, not illustrated. The optical instrument is inserted longitudinally along the coupling, and into mouth 110 of elbow 108. Further insertion of the instrument causes it to follow the contour of elbow 108 and bend radially outward so that the interior of diaphragms 70, 72 and ring 68 can be easily viewed. Mouth 110 of each elbow 108 is radially spaced from inner surface 96 of insert 90. This ensures that the oil film will not be captured by mouth 110 and centrifuged into the interior of undulant section 44 where it can cause a rotary imbalance. In one embodiment, three elbows 108 are used at each undulant section 44, however any number of elbows greater than or equal to two can be used provided they are equally distributed around the circumference of the insert to preclude imbalance.

Figure 3:
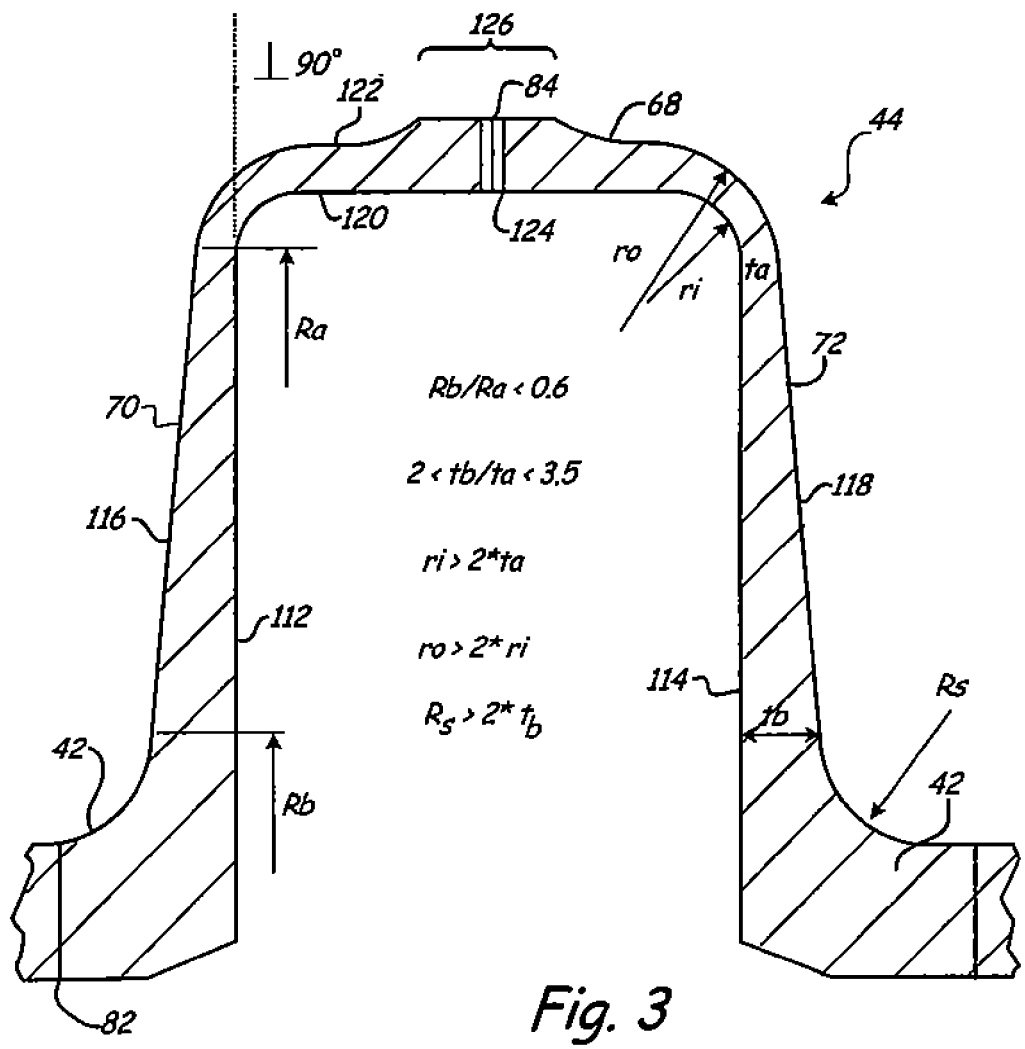
FIG. 3 is a cross-sectional elevation view of an undulant flexible section of the present invention. [Insert text]

FIG. 3 is a cross-sectional elevation view of an undulant flexible section 44 of the present invention. Flexible section 44 again includes cylindrical ring 68 which has a diameter greater than that of spindle 42, and is joined to spindle 42 by longitudinally spaced diaphragms 70 and 72. The diaphragms 70, 72 contain a flat inner straight edge 112 and 114, respectively, and non-symmetric hyberbolic outer edges 116 and 118, respectively. Straight edges 112, 114 reduce the cost of manufacturing the coupling. In the prior art, diaphragms 70, 72 are manufactured by simultaneously and equally removing material from both sides of the diaphragms 70, 72 to create a symmetric and hyperbolic profile. Typically, a specialized machine is used such as those made by Bendix Corporation. With the inventive integral coupling 56, the specialized machines or tooling are not required, and conventional machining processes are used to fabricate the diaphragms 70, 72. In manufacturing the flexible section 44, the flat edge 112 or 114 will be machined first. Flat edge 112 or 114 will then be used a datum reference for fixturing the diaphragm section for subsequent machining operations, including the tapering of the outeredges 116, 118.

In one embodiment, diaphragms 70 and 72 are mirrored images of one another resulting in the standardization of parts to further reduce costs. Diaphragms 70, 72 are joined together by weld 84. Weld 84 is formed by a process such as electron beam welding or similar process known to those in the art. Preferably weld 84 is made on the outside of ring 68 to improve the strength of the ring 68.

In the embodiment illustrated, ring 68 contains a flat inner surface 120 and hyberbolic outer surface 122. In a lubricated system, drain holes 124 are distributed around the circumference of each ring 68. Drain holes 124 distributed around the circumference of each ring 68 allow any oil which inadvertently leaks into the interior of the undulant section 44 to escape, thus preventing the oil from accumulating therein and cause a rotary imbalance of the integral coupling 40. A group of elbows (not illustrated) may also be associated with each undulant flexible section 44 as previously described. The elbows allow the interior of each undulant section 44 can be readily inspected with a flexible optical instrument to inspect welds or search for stress fractures or similar signs of defects.

The hyberbolic outer surface 122 contains balancing rim 126. Balancing rim 126 is an excess of material that can be removed by a process such as machining that allows for balancing of the integral coupling system 40. In an alternate embodiment (not illustrated), inner surface 120 also contains a hyperbolic profile or any similar shape to allow the removal of material from the inner surface for balancing the coupling system 40.

The undulant flexible section 44 contains the following design parameter variables shown in FIG. 3:
Ra: Diaphragm outer radius
Rb: Diaphragm inner radius
ta: Outer radius thickness
tb: Inner radius thickness
ro: Outer ring radius
ri: Inner ring radius
Rs: Shaft/diaphragm fillet radius In one embodiment, the above variables are used to manufacture the undulant flexible section 44 with the following design parameters:
Rb/Ra<0.6
2<tb/ta<3.5
ri>2*ta
ro>2*ri
Rs>2*tb The above design parameters allow integral coupling system 40 of an epicyclic gear train the ability to accommodate the combined axial, lateral, and angular misalignments common for such systems while simultaneously allowing for the transfer of torque in the system. Integral coupling system 40, through the non-symmetric tapered contour profile, isolates the spline system from the helical sun gear misalignment. The integral coupling system 40 primary control design parameters are the thickness and radii ratios as listed. The set of diaphragms as illustrated in FIG. 2 can be of different radial dimensions to isolate the spline system from the epicyclic gear train excursion and shaft system misalignment. Thus, the overall system is improved in reliability because the propensity for spline wear to occur is remote, and the epicyclic gearbox has the ability to operate under misalignment.

Although the present invention has been described with reference to preferred embodiments, workers skilled in the art will recognize that changes may be made in form and detail without departing from the spirit and scope of the invention.

The invention claimed is:

1. A method of constructing an integral coupling system containing a sun gear, the method comprising:
providing an integral sun gear comprising a sun gear component and a connection shaft;
machining a first straight flat inner edge on a first diaphragm to use as a datum point;
fixturing the first straight flat inner edge;
machining a tapered outer edge on the first diaphragm; and
welding the first diaphragm to the integral sun gear wherein the first straight flat inner edge is perpendicular to a central axis of the connection shaft, wherein the first diaphragm comprises an outer radius Ra with a corresponding outer radius thickness ta, an inner radius Rb with a corresponding inner radius thickness tb, an outer ring radius ro, an inner ring radius ri, and a shaft fillet radius Rs, and wherein the first diaphragm has the following design criteria:
Rb/Ra<0.6
2<tb/ta<3.5
ri>2*ta
ro>2*ri
Rs>2*tb.

2. The method of claim 1 further comprising:
machining a second straight flat inner edge on a second diaphragm to use as a datum point;
fixturing the second straight flat inner edge;
machining a tapered outer edge on the second diaphragm; and
welding the first diaphragm to the second diaphragm to form a ring, wherein the second straight flat inner edge is parallel to the first straight flat inner edge.

3. The method of claim 2 further comprising:
machining a straight edge perpendicular to the first straight flat inner edge; and
machining a straight edge perpendicular to the second straight flat inner edge.

4. The method of claim 3 further comprising:
machining a portion of an outer edge of the ring to balance the integral coupling system.

5. The method of claim 1 wherein the integral coupling system comprises as least one undulant flexible section for accommodating misalignment between the sun gear and a shaft within the gear train.

6. A method of constructing an integral coupling system containing a sun gear, the method comprising:
providing an integral sun gear comprising a sun gear component and a connection shaft;
machining a first straight flat inner edge on a first diaphragm to use as a datum point;
fixturing the first straight flat inner edge;
machining a tapered outer edge on the first diaphragm; and
welding the first diaphragm to the integral sun gear wherein the first straight flat inner edge is perpendicular to a central axis of the connection shaft;
machining a second straight flat inner edge on a second diaphragm to use as a datum point;
fixturing the second straight flat inner edge;
machining a tapered outer edge on the second diaphragm; and
welding the first diaphragm to the second diaphragm to form a ring that forms a flexible undulant section of the coupling, wherein the undulant flexible section further comprises an outer radius Ra with a corresponding outer radius thickness ta, an inner radius Rb with a corresponding inner radius thickness tb, an outer ring radius ro, an inner ring radius ri, and a shaft fillet radius Rs, and wherein the at least one undulant flexible section has the following design criteria:
Rb/Ra<0.6
2<tb/ta<3.5
ri>2*ta ro>2*ri Rs>2*tb.

7. The method of claim 6 wherein the second straight flat inner edge is generally parallel to the first straight flat inner edge.

8. The method of claim 6 further comprising:
   machining a straight edge perpendicular to the first straight flat inner edge; and
   machining a straight edge perpendicular to the second straight flat inner edge.

9. The method of claim 6 further comprising:
   machining a portion of the outer edge of the ring to balance the integral coupling system.

10. The method of claim 6 wherein the integral coupling system comprises as least one undulant flexible section for accommodating misalignment between the sun gear and a shaft within the gear train.

* * * * *